United States Patent
Debeze et al.

(10) Patent No.: US 7,265,314 B2
(45) Date of Patent: Sep. 4, 2007

(54) METHOD AND APPARATUS FOR LASER WELDING USING A CW LASER BEAM COMBINED WITH A PULSED LASER BEAM

(75) Inventors: Bruno Debeze, Vincennce (FR); Sophie Jobez, Epinay sur Orge (FR); Hervé Launais, Brunoy (FR)

(73) Assignee: Snecma, Paris (FR)

( * ) Notice: Subject to any disclaimer, the term of this patent is extended or adjusted under 35 U.S.C. 154(b) by 0 days.

(21) Appl. No.: 11/190,019

(22) Filed: Jul. 27, 2005

(65) Prior Publication Data

US 2006/0021976 A1 Feb. 2, 2006

(30) Foreign Application Priority Data

Jul. 27, 2004 (FR) .................................. 04 51677

(51) Int. Cl.
*B23K 26/24* (2006.01)
*B23K 26/06* (2006.01)

(52) U.S. Cl. ........................... 219/121.64; 219/121.63; 219/121.75

(58) Field of Classification Search ........... 219/121.63, 219/121.64, 121.76, 121.75
See application file for complete search history.

(56) References Cited

U.S. PATENT DOCUMENTS 4,566,765 A * 1/1986 Miyauchi et al. ........ 219/121.6
4,958,900 A 9/1990 Ortiz, Jr.

FOREIGN PATENT DOCUMENTS

| DE | 27 13 904 A1 | | 10/1978 |
|----|---|---|---|
| DE | 195 27 070 C1 | | 10/1996 |
| JP | 56-122690 A | * | 9/1981 |
| JP | 58-154484 A | * | 9/1983 |
| JP | 1-233085 A | * | 9/1989 |
| JP | 2002-028795 A | * | 1/2002 |
| JP | 2002-210576 A | * | 7/2002 |
| JP | 2002-210579 A | * | 7/2002 |
| WO | WO 01/26859 A1 | | 4/2001 |
| WO | WO 03/031108 A1 | | 4/2003 |

* cited by examiner

*Primary Examiner*—Geoffrey S. Evans
(74) *Attorney, Agent, or Firm*—Oblon, Spivak, McClelland, Maier & Neustadt, P.C.

(57) ABSTRACT

A method for laser welding at least two metal parts, wherein the parts are welded along a weld area, includes simultaneously applying a continuous laser beam and a pulsed laser beam onto the weld area. The action of the pulsed laser is added to that of the continuous laser; with the continuous laser, it is possible to establish a stable molten bath in the weld area, the pulsed laser by its large peak energy, facilitating penetration of the energy and therefore of the molten bath, which allows deeper welding. A device for implementing the method is also disclosed.

8 Claims, 3 Drawing Sheets

METHOD AND APPARATUS FOR LASER WELDING USING A CW LASER BEAM COMBINED WITH A PULSED LASER BEAM

The invention relates to a method for laser welding at least two metal parts, as well as to associated devices for applying the method.

Many applications in industry require edge-to-edge welding of two metal parts. There exist many welding techniques, for example arc welding, plasma arc welding, electronic beam welding, and laser beam welding . . .

In the aeronautical field, notably, where constraints on the result of the welding are numerous, laser beam welding methods which provide good guarantees on the quality of the weld bead, or electron beam welding methods when the thicknesses are significant, are generally used.

There are two main types of lasers: the so-called continuous lasers and the so-called pulsed lasers, depending on whether the power of the laser beam is emitted continuously or emitted by successive pulses, respectively. Generally, continuous lasers are used for welding applications whereas pulsed lasers are used for machining or drilling applications.

Owing to aeronautical criteria, for parts to be welded with a thickness larger than about 5 mm, electron beam welding methods are presently used as the available powers with lasers are insufficient. Even if one succeeded in using a high power continuous laser, its action would deteriorate the part and make the welding unacceptable, whereas a pulsed laser would pierce the parts instead of welding them. Therefore, the use of an electron beam welding method is presently mandatory.

However, in this case, if the parts to be welded are of a complex shape, the electron beam welding devices do not have sufficient mobility in order to follow the weld line suitably whereas the laser beam welding devices which have better mobility, are not powerful enough to provide a suitable weld, as this has been reported.

The present invention is aimed at solving this problem.

For this purpose, the invention relates to a method for laser welding of at least two metal parts, in which the parts are welded along a weld area, characterized by the fact that a continuous laser beam and a pulsed laser beam are simultaneously applied to the same points on the weld area, the continuous laser beam being arranged so as to form a stable liquid welding bath and the pulsed laser beam being arranged so as to have the bath penetrate into the material.

By the method of the invention, the action of the pulsed laser is added to that of the continuous laser; the continuous laser allows a stable molten bath to be established in the weld area, the pulsed laser by its large peak energy, facilitating penetration of the energy and therefore of the molten bath, which allows deeper welding.

The method of the invention has multiple advantages: in the tapping mode, it provides welding of parts for which the thickness is larger than 5 mm while complying with aeronautical criteria, increase in the welding rates, reduction in the width of the weld bead, and thereby limitation of the deformations of parts, reduction of the porosities related to welding and also welding of parts along weld lines with a complex shape, because of the mobility of the laser welding devices.

The invention will be better understood by means of the following description of the preferred embodiment of the method of the invention and of the devices for applying the method, with reference to the appended drawings, wherein.

Generally, a laser comprises a resonator and a source of energy. The resonator comprises a laser medium containing atoms, molecules or ions capable of releasing photons by stimulated emission, at the ends of which two mirrors facing each other are placed. The source of energy excites the elements of the laser medium which, by stimulated emission, emit photons making roundtrips between both mirrors. One of the mirrors is semi-transparent, allowing the laser beam to be transmitted. Optionally, amplifiers are positioned downstream from the semi-transparent mirror of the resonator. The laser beam is outputted through an optical fiber.

The source of energy may provide continuous energy to the laser medium; as a result, a continuous laser beam is emitted. The source of energy may otherwise provide the laser medium with energy discharges; as a result, a pulsed laser beam is emitted, i.e. a beam whose energy is distributed into pulses. In this case, the beam has maximum energy peaks and provides an average energy over time.

The lasers used within the scope of the method of the invention are the so-called YAG lasers. In the latter, the laser medium consist of an aluminum and yttrium garnet (YAG), doped with neodymium (Nd). The excited particles are neodymium ions $Nd^{3+}$. The lasers used emit a beam with a wavelength of 1064 nm. With the fibers enabling this emission, it is possible to have larger mobility of the device than that of an electron beam welding device, for example, and therefore to weld parts with complex shapes.

Figure 1:
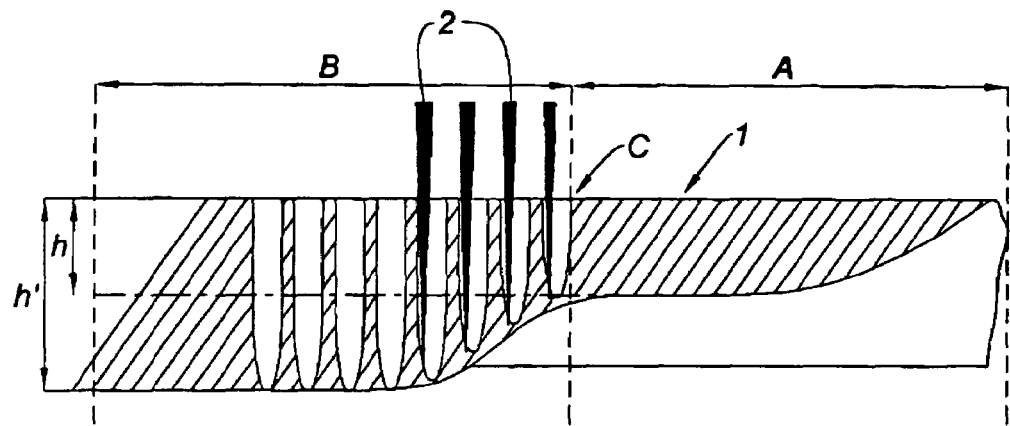
FIG. 1 illustrates a schematic sectional view of a weld bead achieved in part by the method of the invention.

Referring to FIG. 1, the method of the invention is used for edge-to-edge welding of two metal parts by means of two laser beams simultaneously applied on the weld area. Application of such a method is seen in FIG. 1 schematically. The sectional plane of FIG. 1 is located at the junction between two metal parts to be welded, along the weld area 1.

On an area A for which the thickness h to be welded is equal to 5 mm here, application of a continuous YAG laser beam is sufficient for welding. The beam is therefore displaced, here from right to left, at a rate and with a power conventionally determined by the skilled practitioner, before melting the material and allowing it to be welded.

From a point C on an area B, it is desired to perform welding over a thickness h' larger than thickness h. Application of a continuous YAG laser beam does not allow this to be welded. From point C and over the entire area B, a pulsed YAG laser beam, schematized by peaks 2, is then added to the continuous YAG laser beam. Both of these beams are simultaneously applied to the same points, optionally with different settings of their focal distance. Both of the beams are of the same wavelength 1064 nm. The power applied by the continuous YAG laser beam over the entire area B is the same as that on area A.

With the continuous laser beam it is possible to obtain a stable liquid molten bath, whereas the energy peaks of the pulsed laser beam allow the energy to penetrate within the material, and therefore from the bath to the inside of the material, while retaining the stability of the liquid bath. It further provides an increase in welding rate and a reduction of the presence of porosities, related to the occurrence of trapped gas bubbles after solidification of the molten bath.

Thus, the pulsed laser beam acts on the liquid bath formed by the continuous laser beam so as to allow the bath to penetrate into the material. The stirring within the bath is further made more uniform by adding the pulsed laser beam. Finally, the width of the weld bead, for an equivalent weld, is smaller in the case of the use of a pulsed laser beam, which reduces the deformations of the part to be welded.

It is possible, by means of this method, to perform welding over a thickness larger than 5 mm in the tapping mode, i.e. a mode in which welding is carried out over the entire thickness of the part to be welded, between one face and its opposite face.

The method for welding two parts by means of simultaneous application of a continuous laser beam and of a pulsed laser beam may be applied by means of various devices, some of which will be described as an illustration.

Figure 2:
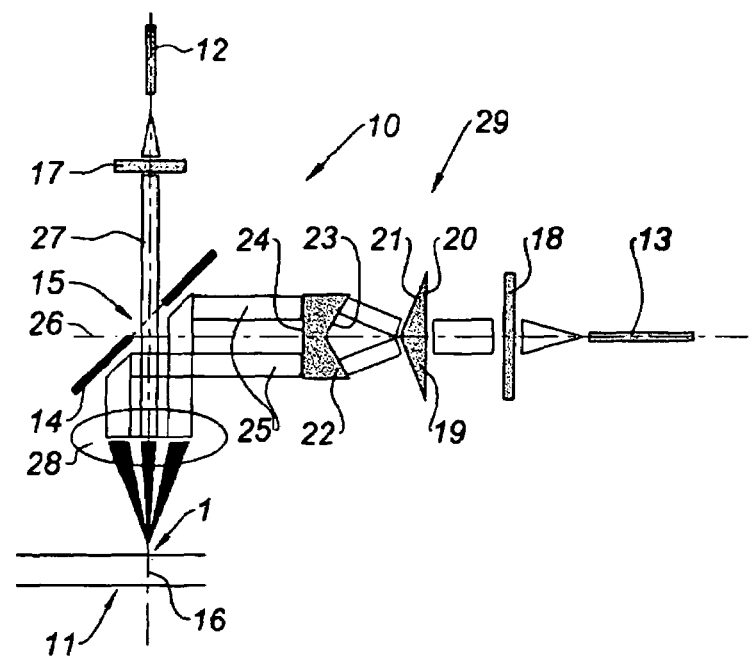
FIG. 2 illustrates a schematic profile view of a first device for applying the method of the invention.
Figure 3:
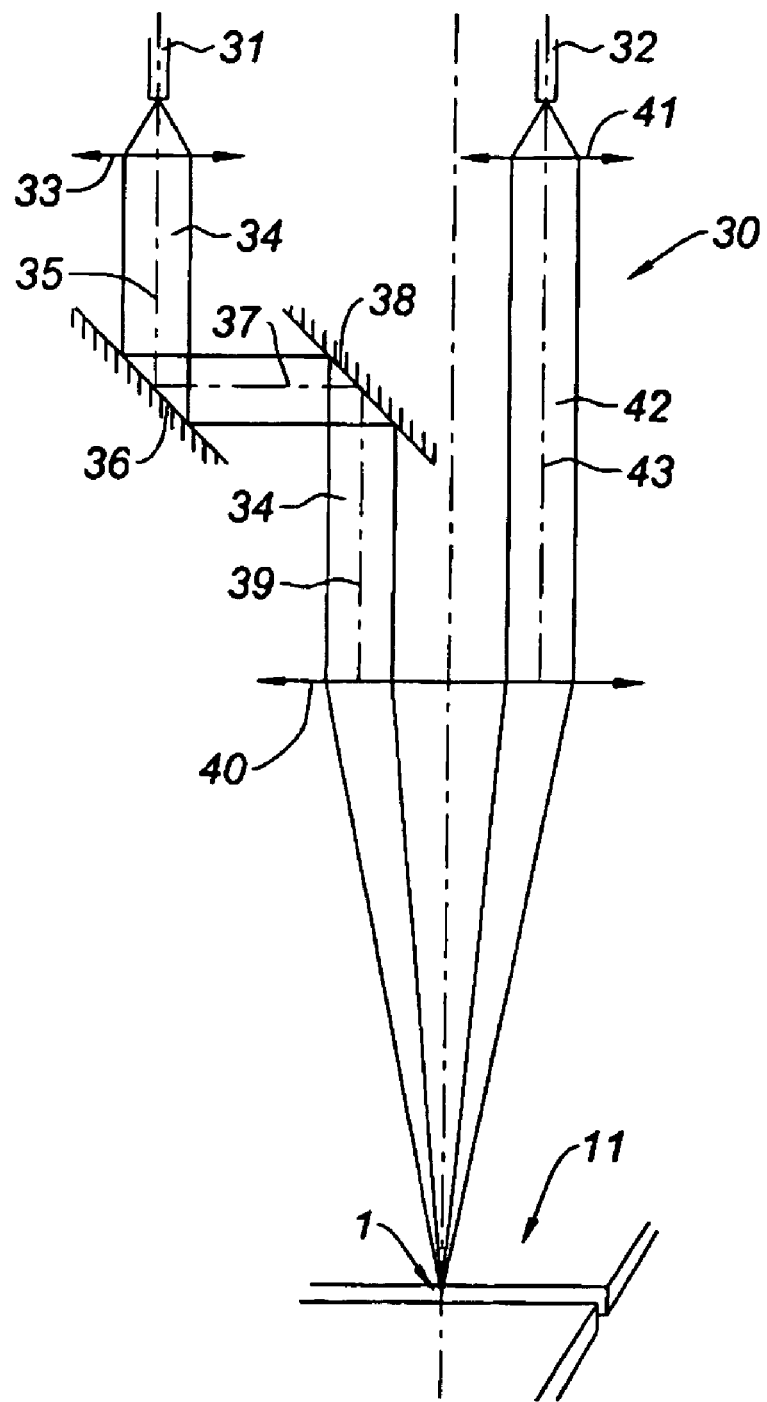
FIG. 3 illustrates a schematic profile view of a second device for applying the method of the invention.
Figure 4:
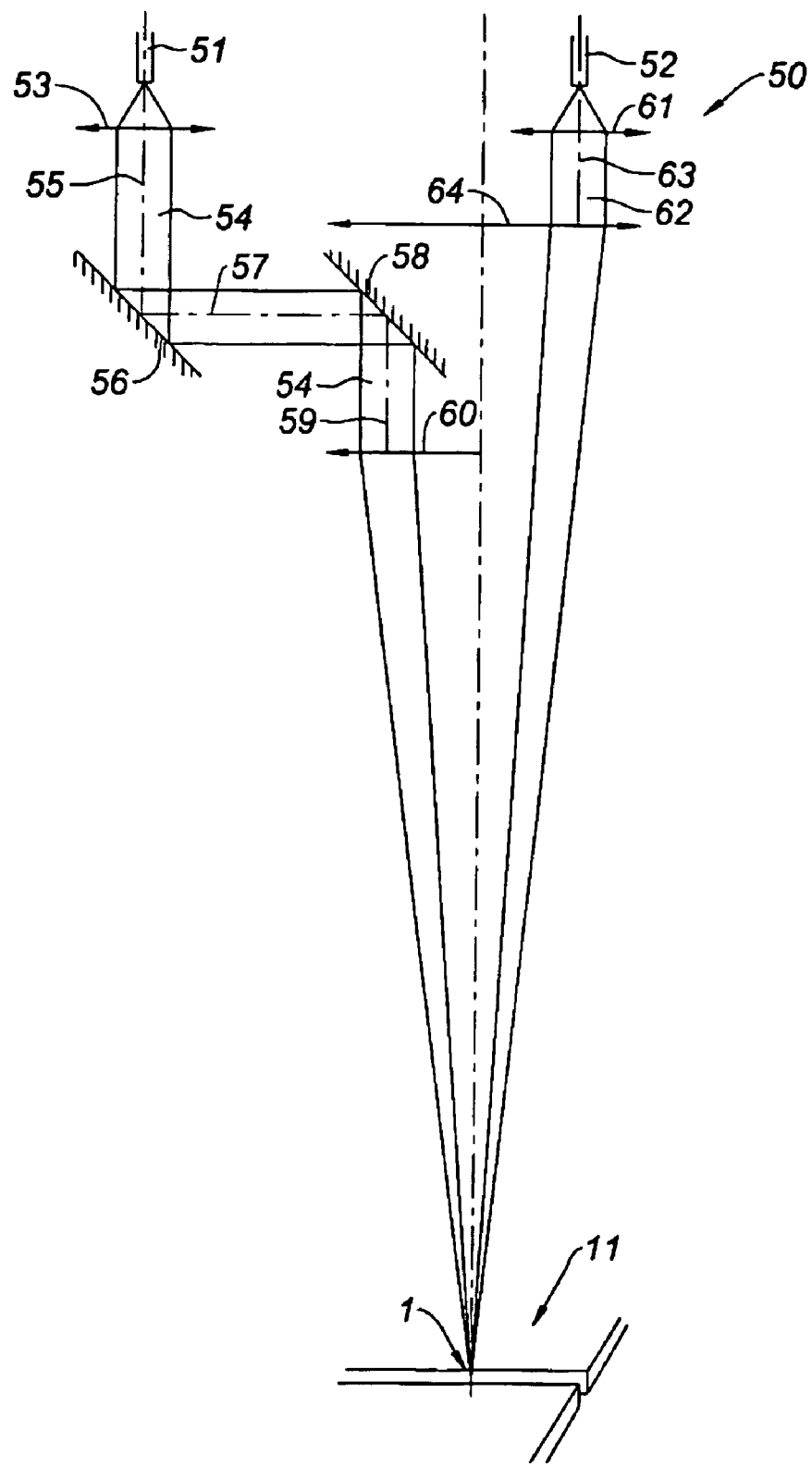
FIG. 4 illustrates a schematic profile view of a third device for applying the method of the invention.

In FIGS. 2, 3 and 4, it will be considered that the parts 11 to be welded have a horizontal planar surface. Therefore the notions of verticality and horizontality will be understood with respect to this orientation of the surface to be welded, and it is obvious that the orientations of the devices will consequently be adapted in the case of lack of horizontality of the surfaces to be welded.

FIG. 2 illustrates a first device 10 for applying the welding method. This device 10 comprises two laser sources, not shown.

The first laser source includes at the output a fiber 12 emitting a pulsed YAG laser beam; this fiber 12 is placed at the vertical of the weld area 1 of the part 11 to be welded, globally orientated perpendicularly to the surface of the parts 11. The second laser source includes at the output a fiber 13 emitting a continuous YAG laser beam; this fiber 13 is orientated perpendicularly to the fiber 12 of the pulsed laser.

A mirror 14, pierced with a circular hole 15, is placed between the fiber 12 of the pulsed laser and the parts 11 to be welded. It is orientated at 45° C. relatively to the axis 16 of this fiber 12. The pulsed laser beam from the fiber 12, after having passed through a collimating lens 17, propagates as a cylindrical pulsed laser beam 27 and passes through the mirror 14 via its hole 15. The mirror 14 therefore has no influence on the propagation of the cylindrical pulsed laser beam 27.

The continuous laser beam from fiber 13 passes through a collimating lens 18 and then passes through a first prism 19, the upstream surface of which 20 is planar and the downstream surface 21 is convex conical, and then through a second prism 22, the upstream surface of which 23 is concave conical and the downstream surface 24 is planar. An annular continuous laser beam 25 is obtained at the output of the second prism 22. The first prism 19 and the second prism 22 make up a device 29 for forming an annular continuous laser beam 25.

The annular continuous laser beam 25 then propagates towards the return mirror 14, the surface of which is orientated at 45° relatively to the axis 26 of the annular beam 25, because of the perpendicularity between fibers 12, 13 emitting the pulsed and continuous laser beams. The hole 15 of the mirror 14 is arranged so that the annular beam 25 impinges on the mirror 14 around the hole 15, without penetrating therein, and is therefore reflected perpendicularly to its axis 26 of incidence, in the axis 16 of the cylindrical pulsed laser beam 27.

Thus, downstream from the mirror 14 towards the parts 11 to be welded, the cylindrical pulsed laser beam 27 propagates inside the annular continuous laser beam 25, concentrically relatively to the latter. Both of these beams 25, 27 then pass through a focusing lens 28, and are focused for impinging on the parts 11 at the same place on the weld area 1, whereby they may be either focused or not at different depths, according to what is desired. They thereby apply the method for welding parts 11 by means of a continuous laser beam 25 and of a pulsed laser beam 27 applied simultaneously.

FIG. 3 illustrates a second device 30 for applying the welding method. This device 30 comprises two laser sources, not shown.

The first laser source includes at the output a fiber 31 emitting a pulsed YAG laser beam; this fiber 31 is placed vertically, but shifted from the weld area 1 of the parts 11 to be welded, globally orientated perpendicularly to the surface of the parts 11 in the weld area 1. The second laser source includes at the output a fiber 32 emitting a continuous YAG laser beam; this fiber 32 is orientated parallel to the fiber 31 of the pulsed laser. Both fibers 31, 32 are located at the same altitude relatively to the surface of the weld area 1.

The pulsed laser beam from fiber 31 passes through a collimating lens 33, from which it emerges as a "cylindrical" pulsed laser beam 34 along an axis 35, vertical here. This cylindrical pulsed laser beam 34 then propagates towards a first return mirror 36, orientated at 45° with respect to its axis 35, and is therefore reflected so that it propagates along a second axis 37 perpendicular to its original axis 35, towards a second return mirror 38, orientated at 45° with respect to the second axis 37. The cylindrical pulsed laser beam 34 is reflected by the second mirror 38 along an axis 39 parallel to its original axis 35, but shifted, relatively to the latter, by the horizontal distance between both mirrors 36, 38.

The cylindrical pulsed laser beam 34 reflected by the second mirror 38 then propagates towards a focusing lens 40.

The continuous laser beam from fiber 32 passes through a collimating lens 41, from which it emerges as a "cylindrical" continuous laser beam 42 along an axis 43, vertical here and parallel to the axis 39 of propagation of the pulsed laser beam reflected by the second mirror 38. This cylindrical continuous laser beam 42 then propagates towards the focusing lens 40, parallel to the cylindrical pulsed laser beam 34 reflected by the second mirror 38, the latter being placed with a sufficient shift relatively to the axis 43 of propagation of the cylindrical continuous laser beam 42 so as not to interfere on its propagation.

The focusing lens 40 is positioned perpendicularly to the axes 39, 43 of propagation of the pulsed 34 and continuous 42 cylindrical laser beams, i.e. horizontally here. Both of these beams 34, 42 pass through the lens 40 in different areas, and the device is arranged so that their focusing occurs at the same location on the parts to be welded 11 in the weld area 1, either at the same depth or not, according to what is desired, thereby allowing the application of the method for welding parts 11 by means of a continuous laser beam 42 and a pulsed laser beam 34 applied simultaneously.

The first mirror 36 is adjustable vertically, whereas the collimating leans 41 of the continuous laser beam is adjustable horizontally, in order to vary the angle between the beams 34, 42 at their output from the focusing lens.

FIG. 4 illustrates a third device 50 for applying the welding method. This device 50 comprises two laser sources, not shown.

The first laser source includes at the output a fiber 51 emitting a pulsed YAG laser beam; this fiber 51 is placed at the vertical, but shifted from the weld area 1 of the parts 11 to welded, globally orientated perpendicularly to the surface of the parts 11 in the weld area 1. The second laser source includes at the output a fiber 52 emitting a continuous YAG laser beam; this fiber 52 is orientated parallel to the fiber 51 of the pulsed laser. Both fibers 51, 52 are located at the same altitude relatively to the surface of the weld area 1.

The pulsed laser beam from the fiber 51 passes through a collimating lens 53, from which it emerges as a "cylindrical" pulsed laser beam 54 along an axis 55, vertical here. This cylindrical pulsed laser beam 54 then propagates towards a first return mirror 56, orientated at 45° with respect to its axis 55, and is therefore reflected so that it propagates along a second axis 57 perpendicular to its original axis 55, towards a second return mirror 58, orientated at 45° with respect to the second axis 57. The cylindrical pulsed laser beam 54 is reflected by the second mirror 58 along an axis 59 parallel to its original axis 55, but shifted, relatively to the latter, by the horizontal distance between both mirrors 56, 58.

The cylindrical pulsed laser beam 54 reflected from the second mirror 58 then propagates towards a focusing half-lens 60, the usefulness of which will be explained later on.

The continuous laser beam from the fiber 52 passes through a collimating lens 61, from which it emerges as a "cylindrical" continuous laser beam 62 along an axis 63, here vertical and parallel to the axis 59 of propagation of the pulsed laser beam reflected by the second mirror 58. The cylindrical continuous laser beam 62 then propagates towards a focusing lens 64.

The focusing half-lens 60 and the focusing lens 64 are positioned perpendicularly to the axes 59, 63 of propagation of the pulsed 54 and continuous 62 cylindrical laser beams, i.e. horizontally here. They are arranged so that the focusing of the beams 54, 62 occurs at the same location on the parts to be welded 11 in the weld area 1, either at the same depth or not, according to what is desired, thereby allowing application of the method for welding parts 11 by means of a continuous laser beam 42 and a pulsed laser beam 34 applied simultaneously.

The focusing lens 64 of the continuous laser beam 62 is located in altitude, vertically, above the mirrors 56, 58 and therefore also above the focusing half-lens 60.

Focusing of the pulsed laser beam 54 is performed by means of a half-lens 60 in order to maximally bring the pulsed laser beam 54 close to the continuous laser beam 62. Thus, the beams 54, 62, tend to be superimposed, while retaining the independence of their propagation; both beams 54, 62 only meet in the weld area 1.

The first mirror 56 is adjustable vertically, whereas the collimating lens 61 of the continuous laser beam is adjustable horizontally, in order to vary the angle between the pulsed 54 and continuous 62 laser beams at their output from the focusing half-lens 60 and the focusing lens 64, respectively.

The three devices which have just been described may operate with or without the pulsed laser, according to the desired welding, and depending on the desired application, the adjustment of the surrounding gas medium, of the various powers, power variations over time, focal distances, polarization, . . . of the laser beams will be adapted by the skilled practitioner.

As an example, in the described devices, the pulsed laser 27, 34, 54 may have an average power of 1 kW and a peal power of 30 kW and the continuous laser 25, 42, 62 may have a power of 4 kW.

As a further example, for the third device of FIG. 4, the focusing half-lens 60 has a focal distance of 200 mm and the focusing lens 64 has a focal distance of 250 mm, both lenses 60, 64 being distant in altitude by 50 mm and the weld area 1 being located at 250 mm from the focusing lens 64.

The method of the invention has been described in conjunction with the use of YAG lasers, but it is obvious that other lasers, one in a continuous mode and the other in a pulsed mode, may be used, if they are able to deliver sufficient power.

Additionally, the method has been described for edge-to-edge welding of two metal parts, but it may also be used, under certain conditions, for welding more than two parts.

The invention claimed is:

1. A method for laser welding at least two metal parts, comprising:
    welding the at least two parts along a weld area, wherein said welding comprises:
    simultaneously applying a continuous laser beam and a pulsed laser beam to same points on the weld area,
    arranging the continuous laser beam in order to form a stable liquid welding bath,
    arranging the pulsed laser beam to cause the bath to penetrate into a material of the welded area,
    focusing the continuous laser beam with a focusing lens, and
    focusing the pulsed laser beam with a focusing half-lens on the weld area.

2. The method according to claim 1, comprising focusing the continuous laser beam and the pulsed laser beam on the same points on the weld area.

3. The method according to claim 1, comprising focusing the continuous laser beam and the pulsed laser beam at different depths in the parts on the weld area.

4. The method according to claim 1, comprising generating the continuous laser beam and the pulsed laser beam with a YAG laser.

5. A device for applying a method of laser welding at least two metal parts along a weld area, the method including simultaneously applying a continuous laser beam and a pulsed laser beam to same points on the weld area, said device comprising:
    a lens for collimating the pulsed laser beam,
    a lens for collimating the continuous laser beam,
    a first mirror and a second mirror for sending back the pulsed laser beam, and
    a lens for focusing the continuous laser beam and the pulsed laser beam onto the weld area,
    wherein the first mirror for sending back the pulsed laser beam and the lens for collimating the continuous laser beam are adjustable so as to be able to set the angle between the pulsed laser beam and the continuous laser beam.

6. The device according to claim 5, wherein the method comprises focusing the continuous laser beam and the pulsed laser beam into cylindrical beams with a same focusing lens on the weld area.

7. A device for applying a method of laser welding at least two metal parts along a weld area, the method including simultaneously applying a continuous laser beam and a pulsed laser beam to same points on the weld area, said device comprising a lens for collimating the pulsed laser beam, a lens for collimating the continuous laser beam, a first mirror and a second mirror for sending back the pulsed laser beam, a lens for focusing the continuous laser beam and a half-lens for focusing the pulsed laser beam onto the weld area.

8. The device according to claim 7, wherein the first mirror for sending back the pulsed laser beam and the lens for collimating the continuous laser beam are adjustable in order to be able to set the angle between the pulsed laser beam and the continuous laser beam.

* * * * *